July 10, 1934.  H. H. ANGEL ET AL  1,966,086
STEEL MILL TEMPERATURE INDICATOR
Filed Nov. 1, 1929  2 Sheets-Sheet 1
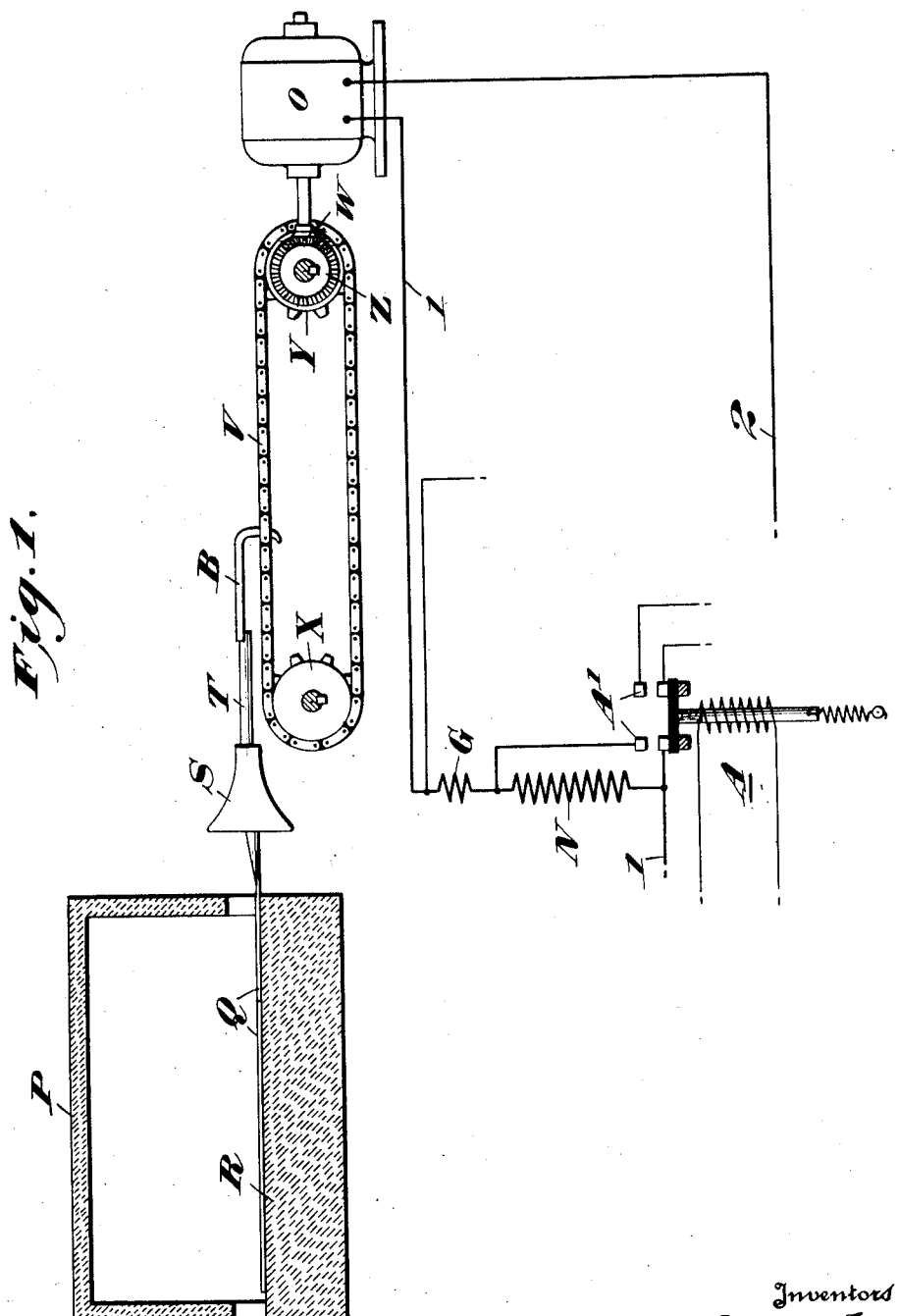
Inventors
H. H. Angel
and E. Cook.
By R. S. C. Dougherty.
Attorney

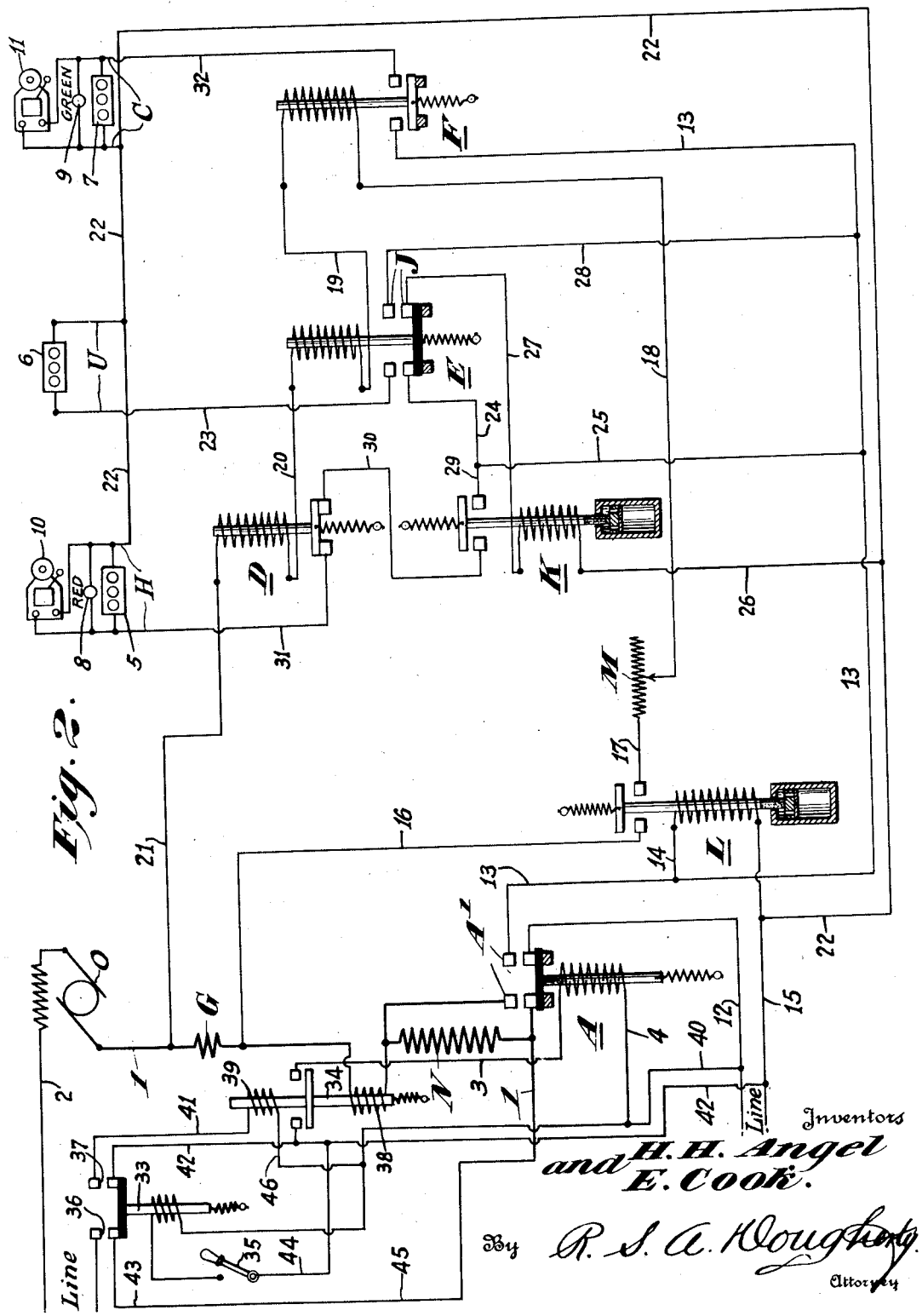

Patented July 10, 1934

1,966,086

UNITED STATES PATENT OFFICE 1,966,086

STEEL MILL TEMPERATURE INDICATOR

Harry H. Angel, Sparrows Point, and Earnshaw Cook, Baltimore, Md., assignors to Bethlehem Steel Company, a corporation of Pennsylvania Application November 1, 1929, Serial No. 403,965

2 Claims. (Cl. 177—311)

Our invention has for its object a method and means for indicating deviations from the optimum heating practice for skelp in the manufacture of butt and lap weld tubing.

The process for producing pipe or tubing by these methods consists essentially in heating the skelp or strip on the hearth of a regenerative furnace to a welding temperature, and in drawing or by some other method, forcing the skelp through a bell to bring about the uniting of the edges. The welding operation may or may not be preceded by a separate operation in which the skelp is bent into circular form.

It is well known that the temperature of the skelp together with the degree of oxidation of its surface, the duration of the heating period and numerous other factors must be carefully controlled in order to produce a satisfactory weld. In the following the terms "hot" and "cold" will be used to indicate conditions of the skelp which are normally produced by too high or too low a temperature respectively, although it should be understood that numerous factors other than the temperature enter into the properties which are classified as "hot" or "cold".

We have found that the suitability of skelp for welding may be satisfactorily indicated by measuring the power required to drive same through the welding bell, i. e. that the temperature and other conditions within the heating furnace may be maintained in a satisfactory state by keeping the power input to the drive motor within certain limits for each type and size of tubing being welded. The apparatus described below serves to indicate to the furnace operators whether said conditions are correct or whether the temperature of the furnace should be raised or lowered. In addition it registers the total number of pipe produced, the number of pipe welded on the hot side and the number of pipe on the cold side.

In the attached drawings, Fig. 1 diagrammatically represents the welding equipment used for butt weld tubing and Fig. 2 shows a preferred assembly of electrical equipment for carrying out our invention.

Referring to Fig. 1, a welding furnace is indicated in section by P. The hearth is represented by R and a piece of skelp lying on the hearth by Q. The skelp is being drawn through a butt welding bell S by tongs B. The skelp is converted to a circular shape and the seam welded in bell S, so that it emerges as tubing T. The tongs B are hooked into an aperture in the chain V, which runs on the sprockets X and Y. Sprocket Y is driven by motor O through the bevel gear and pinion Z and W. Current is supplied to motor O by conductors 1 and 2. In conductor 1 is inserted starting resistance N and shunt G for the control circuit. These elements are included in Fig. 2, together with their associated circuits.

Referring to Fig. 2, 35 represents a manually operated switch used to start motor O. This switch completes a circuit through the actuating coil of contactor 33 as follows: Starting at line conductor 15, we have conductor 42, conductor 44, switch 35, conductor 43, coil of contactor 33, and return to line conductor 12 by conductor 40. The actuation of contactor 33 closes the motor circuit at contacts 36 through current limiting resistance N and also closes an auxiliary circuit at contacts 37 which includes: line conductor 15, conductor 42, contacts 37, conductor 41, the actuating coil 39 of contactor 34, conductor 46 and return to line conductor 12 by conductor 40. The closure of contactor 34 causes the actuation of contactor A which in turn short circuits starting resistance N and closes the control circuit of the indicating and registering devices. The circuit set up by the closure of contactor 34 is from line conductor 15 through conductor 42 to contacts of contactor 34, thence by conductor 3 to the actuating coil of contactor A and return to line conductor 12 by conductors 4 and 40. Contactor 34 however, is prevented from closing during the major part of the starting period by restraining coil 38 which carries the motor current. This coil plus the spring exert a combined force greater than that of actuating coil 39 until the starting current of the motor has fallen to a value such that resistance N can safely be eliminated from the motor circuit.

Let us consider that the motor O has been started and that the peak current drawn by the motor has been sufficiently reduced to permit closing of contactor A. Upon closure of contactor A current will flow from the line through conductor 12 contacts $A^1$ conductor 13 conductor 14, the actuating coil of time switch L and return to the line through conductor 15. After an interval determined by the adjustment of the dash pot of switch L (and during which the motor current will have dropped to the normal friction load of 25 amperes) switch L will close. As a result of the closure of L a circuit will be established containing shunt G, conductor 16, contacts of switch L, conductor 17, rheostat M, conductor 18, the actuating coil of contactor F, conductor 19, the actuating coil of contactor E, conductor 20, the actuating coil of contactor D, and return to G through conductor 21.

The above events result in energizing the control circuit of the indicating circuit contactors by means of the voltage drop across shunt G but do not cause operation of said contactors since the current drawn by motor O subsequent to the closing of time switch L has been less than the minimum operating current of any of said contactors (35 amperes for contactor E). Let us now assume that a length of skelp enters the welding bell and that it is at the proper temperature—equivalent to a motor load of from 40 to 55 amperes. The resulting increase in current will cause the actuation of contactors D and E. The closure of E establishes a circuit from line conductor 15 through conductor 22, "unit" counter 6, conductor 23, contacts of E, conductors 24 and 25 to live conductor 13. Counter 6 which is operated once for each closure of contactor E thus registers the welding of one length of skelp. A second circuit is established by the closure of E which includes: Conductor 22, conductor 26, the actuating coil of time switch K, conductor 27, the auxiliary contacts J of contactor E, conductor 28 and conductor 13. As a result of current flow in this circuit time switch K will close after a predetermined interval (normally 1½ seconds). The function of time switch K is to close the "hot pipe" indicating circuit H after a stable load current has been established and provided said load current is less than the minimum established for satisfactory pipe (40 amperes). In the present case however it is assumed that contactor D was actuated simultaneously with contactor E and that the closure of K is therefore without effect.

In case a piece of skelp which exceeds the desired temperature enters the welding bell, i. e. one which will produce a motor load represented by 35 to 40 amperes, the following takes place: Contactor E closes, contactor D is not actuated and remains in its normally closed position, the closure of E results in energizing the "unit" counter circuit and the actuating circuit of time switch K as previously described and the closure of K establishes a circuit which includes: Conductors 13, 25 and 29, the contacts of time switch K, conductor 30, the contacts of contactor D, conductor 31, "hot skelp", counter 5 incandescent lamp 18 and bell 10 and return conductor 22. The welding of a "hot" pipe is thereby indicated and registered and at the same time the welding of the pipe is also registered on the "unit" counter as in the first instance.

In case a "cold" piece of skelp enters the welding bell, i. e. one which produces a motor load of over 55 amperes, the following takes place: Contactors D and E are actuated which results in the operation of the "unit" counter and in the opening of the "hot pipe" circuit H before the closure of time switch K. In addition, contactor F is actuated and a circuit thereby established which contains: Conductor 13, the contacts of contactor F, conductor 32, "cold pipe" counter 7, lamp 9 and bell 11, and return conductor 22. The welding of a "cold pipe" is thereby indicated and registered and an additional "unit" registered as before.

The indicating and registering circuits, H, U and C for indicating and registering the condition of the skelp are closed by contactors D, E and F respectively. Circuit H closed by contactor D indicates "hot" pipe; circuit U closed by contactor E registers the number of pipe welded, regardless of the condition of the skelp and is hereinafter referred to as the unit registering circuit; circuit C closed by contactor F, indicates "cold" pipe. An electro-magnetic counter (5, 6 and 7) is actuated by each of the three circuits H, U and C. Circuits H and C also cause visible and audible signals (8, 9, 10 and 11) to be operated at the furnace for the benefit of the operators. The actuating coils of contactors D, E and F are connected in series. The terminals of this series are connected to either end of shunt G in the armature circuit of the drive motor through the contacts of time switch L and rheostat M. To illustrate the operation of the apparatus, let us suppose that it has been found that, for a given size of pipe, the current required for a successful weld is between 40 and 55 amperes. Let us further assume that the friction load on the drive motor is represented by a current of 25 amperes. Contactor E will then be set to operate at 35 amperes. Contactor D at 40 amperes and contactor F at 55 amperes. The currents referred to are those carried by shunt G in the motor circuit. Contactors E and F are normally open. Contactor D is normally closed.

Rheostat M is included in the control circuit to adjust the actuating current values of the contactors to various sizes of pipe being welded. In addition to this, the actuating current values for each contactor may be adjusted by regulating the spring tension or weights which oppose the action of the electro-magnetic actuating coils.

Having thus described our invention what we claim as new and desire to secure by Letters Patent is:

1. In combination a tube welding mill, an electric drive motor for said mill, a power circuit supplying current to said drive motor and containing a shunt, three contactors, a control circuit containing said shunt and the actuating coils of said contactors, said contactors being responsive respectively to three successively greater predetermined amounts of current in said power circuit, a registering circuit closed by the first of said contactors, an indicating and registering circuit closed by the third of said contactors, a second indicating and registering circuit opened by the actuation of the second of said contactors and means associated with said first contactor to close said second indicating and registering circuit a predetermined interval of time after the actuation of said first contactors.

2. In combination a tube welding mill, an electric drive motor for said mill, a power circuit supplying current to said drive motor and containing a current limiting starting device for said drive motor and a shunt, three contactors, a control circuit containing said shunt and the actuating coils of said contactors, said contactors being responsive respectively to three successively greater predetermined amounts of current in said power circuit, means associated with said starting device for closing said control circuit a predetermined interval of time after the actuation of said starting device, a registering circuit closed by the first of said contactors, an indicating and registering circuit closed by the third of said contactors, a second indicating and registering circuit opened by the actuation of the second of said contactors and means associated with said first contactor to close said second indicating and registering circuit a predetermined interval of time after the actuation of said first contactor.

HARRY H. ANGEL.
EARNSHAW COOK.